(12) United States Patent
Hedlund

(10) Patent No.: US 10,113,301 B2
(45) Date of Patent: Oct. 30, 2018

(54) ARRANGEMENT FOR THE REMOVABLE COUPLING OF A TOOL WITH A MANOEUVRABLE ARM OF A WORKING MACHINE

(71) Applicant: BROKK AKTIEBOLAG, Skellefteå (SE)

(72) Inventor: Jan Hedlund, Skellftea (SE)

(73) Assignee: BROKK AKTIEBOLAG, Skelleftea (SE)

( * ) Notice: Subject to any disclaimer, the term of this patent is extended or adjusted under 35 U.S.C. 154(b) by 446 days.

(21) Appl. No.: 14/850,600

(22) Filed: Sep. 10, 2015

(65) Prior Publication Data

US 2016/0076220 A1     Mar. 17, 2016

(30) Foreign Application Priority Data

Sep. 12, 2014 (SE) ...................... 1451056

(51) Int. Cl.
  *E02F 9/00* (2006.01)
  *E02F 3/36* (2006.01)
  *F16C 11/10* (2006.01)

(52) U.S. Cl.
  CPC ............ *E02F 9/006* (2013.01); *E02F 3/3613* (2013.01); *E02F 3/3618* (2013.01); *E02F 3/3622* (2013.01); *E02F 3/3663* (2013.01); *F16C 11/10* (2013.01)

(58) Field of Classification Search
  CPC ..... E02F 3/3613; E02F 3/3618; E02F 3/3622; E02F 3/3663; E02F 9/006; F16C 11/10
  USPC ............................ 403/321; 37/468; 172/272
  See application file for complete search history.

(56) References Cited

U.S. PATENT DOCUMENTS

| | | | | |
|---|---|---|---|---|
| 3,935,953 A | * | 2/1976 | Stedman | E02F 3/3618 172/272 |
| 4,013,182 A | * | 3/1977 | Pratt | E02F 3/3618 172/272 |
| 4,116,346 A | * | 9/1978 | Uchida | E02F 3/3618 172/273 |
| 4,116,347 A | * | 9/1978 | Uchida | E02F 3/3618 172/272 |
| 4,204,794 A | * | 5/1980 | Aoshiba | E02F 3/3618 172/272 |

(Continued)

FOREIGN PATENT DOCUMENTS

| | | | | |
|---|---|---|---|---|
| GB | 2169582 | † | 7/1986 | |
| GB | 2169582 A | * | 7/1986 | ............ E02F 3/3618 |

(Continued)

*Primary Examiner* — Jamie L McGowan
(74) *Attorney, Agent, or Firm* — Knobbe, Martens, Olson & Bear, LLP

(57) ABSTRACT

An arrangement for removable coupling of a tool with a working machine includes a first part with opposing indentions, which is supported by the tool, and a second part that is supported by a maneuverable arm, which includes shafts to be introduced into the indentations, a lever with which the shafts can be moved away from each other, and a locking mechanism for the displacement of the shafts. One of the shafts is united at a joint with a first arm section, and another shaft is united at a joint with a second arm section. The arrangement also includes at least one knee lever joints, one of which demonstrates two levers united with the shafts.

13 Claims, 3 Drawing Sheets

(56) References Cited

U.S. PATENT DOCUMENTS

| | | | | |
|---|---|---|---|---|
| 4,265,587 A * | 5/1981 | Clark | E02F 3/3618 | 172/273 |
| 4,488,850 A * | 12/1984 | Wernimont | E02F 3/3618 | 37/407 |
| 4,854,813 A * | 8/1989 | Degeeter | E02F 3/3622 | 172/272 |
| 4,955,779 A * | 9/1990 | Knackstedt | E02F 3/3627 | 137/595 |
| 5,024,010 A * | 6/1991 | Hulden | E02F 3/3622 | 37/417 |
| 5,242,258 A * | 9/1993 | Weyer | E02F 3/3618 | 37/468 |
| 5,400,531 A * | 3/1995 | Brown | E02F 3/3618 | 37/468 |
| 5,465,513 A * | 11/1995 | Sonerud | E02F 3/3618 | 37/403 |
| 5,466,113 A * | 11/1995 | Norberg | A01B 59/064 | 37/468 |
| 5,494,396 A * | 2/1996 | Geier | E02F 3/3627 | 37/468 |
| 5,515,626 A * | 5/1996 | Holscher | E02F 3/3622 | 37/379 |
| 5,581,917 A * | 12/1996 | Barden | E02F 3/3618 | 172/272 |
| 6,202,331 B1 * | 3/2001 | Kobayashi | E02F 3/3618 | 37/403 |
| 6,231,296 B1 * | 5/2001 | Blomgren | E02F 3/3631 | 37/468 |
| 6,659,708 B2 * | 12/2003 | Heiple | E02F 3/3618 | 37/468 |
| 6,857,842 B2 * | 2/2005 | Heiple | E02F 3/3636 | 37/468 |
| 7,014,385 B2 * | 3/2006 | Lim | E02F 3/3618 | 172/272 |
| 7,198,451 B2 * | 4/2007 | Wimmer | E02F 3/3627 | 37/468 |
| 7,963,054 B2 * | 6/2011 | Wimmer | E02F 3/3627 | 172/272 |
| 2001/0050326 A1 † | 12/2001 | Muroto | | |
| 2003/0131505 A1 * | 7/2003 | Heiple | E02F 3/3636 | 37/468 |
| 2009/0255151 A1 * | 10/2009 | Wimmer | E02F 3/3627 | 37/468 |

FOREIGN PATENT DOCUMENTS

| | | | |
|---|---|---|---|
| GB | 2269359 | † | 2/1994 |
| WO | 2013187851 | † | 12/2013 |

\* cited by examiner
† cited by third party

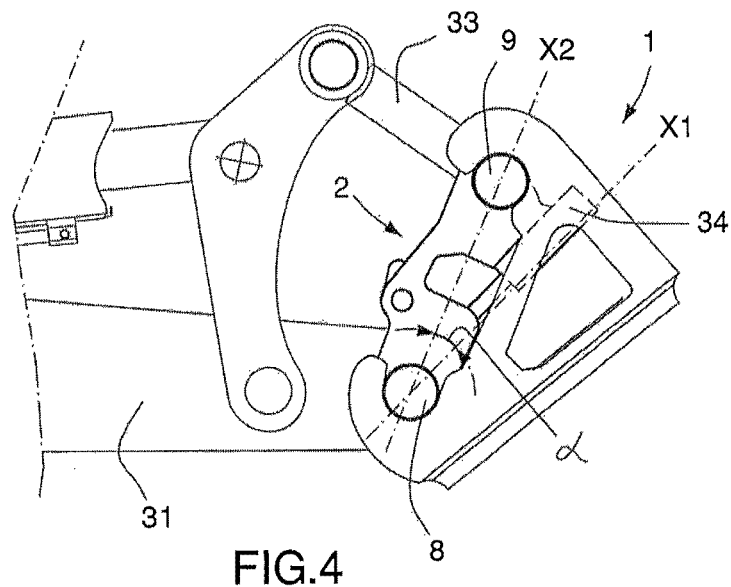
FIG.4
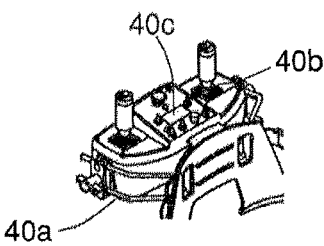
FIG.5A
FIG.5B
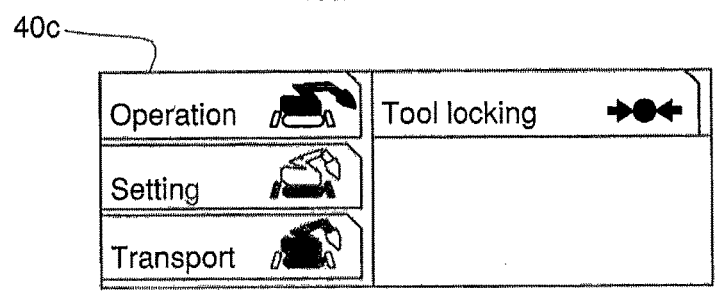
Operating mode
Tool locking 

ARRANGEMENT FOR THE REMOVABLE COUPLING OF A TOOL WITH A MANOEUVRABLE ARM OF A WORKING MACHINE

CROSS-REFERENCE TO RELATED APPLICATIONS

This application claims priority to Swedish Patent Application No. SE 1451056-4 filed on Sep. 12, 2014, the disclosure of which including the specification, the drawings, and the claims is hereby incorporated by reference in its entirety.

FIELD OF THE INVENTION

The present invention concerns an arrangement for the removable coupling of a tool with a manoeuvrable arm of a working machine. The invention concerns also the use at a coupling arrangement of an adjustable control and actuator means that is activated by a medium under pressure and that has an inverted function.

BACKGROUND OF THE INVENTION

Coupling arrangements of this type for the removable coupling of a tool with a manoeuvrable arm of a working machine are previously known. One disadvantage with prior art coupling arrangements is that they are complicated and add a great deal to the distance between the end of the manoeuvrable arm end and the tool. Prior art coupling arrangements normally comprise a separate mounting plate or an intermediate piece, at one side of which the manoeuvrable arm of the working machine is jointed attached while the coupling arrangement itself is attached at the other end of the intermediate piece. Due to the presence of the mounting plate, four shafts are required between the manoeuvrable arm of the working machine and the tool, whereby two shafts are arranged at the intermediate piece and two shafts at the coupling arrangement itself. It is desirable to reduce the need for the said double pairs of shafts. The coupling arrangement becomes unnecessarily heavy through its complexity, whereby the centre of gravity of the working machine is displaced in a disadvantageous manner during extension of the arm.

Prior art fixtures do not have the flexibility that is required to be able to be used with a number of different types of tool independently of the manufacturer and independently of the relative distance between the attachment points of the tool, whereby certain tools may be particularly "tight" and it must be possible to reduce the coupling arrangement a great deal to make it possible to fasten between the attachment points, while other tools may be so "broad" between the attachment points that there is a risk that play arises. Prior art fastening arrangements cannot be adjusted such that the gap or the relative distance between the grippers of the coupling arrangement correspond to the attachment points of the existing tool, which is necessary in order to achieve safe and play-free fastening and to maintain a firm grip during work with the tool.

SUMMARY OF THE INVENTION

A first purpose of the present invention, therefore, is to achieve an arrangement for the removable coupling of a tool with a manoeuvrable arm of a working machine that solves the problems described above and makes it possible to allow the mounting and demounting of a tool at the arm of a working machine in a simple, rapid and safe manner. A lightweight coupling arrangement is primarily aspired to that demonstrates the absence of an intermediate piece that increases the distance between the free end of the manoeuvrable arm and the attachment of the tool. The elimination of such an intermediate piece means that the coupling arrangement can receive a low additional distance, a simplified design, with low weight and a significant saving in material consumption. Through a saving of weight, i.e. with a lower net weight of the coupling arrangement, the working machine can support heavier and thus more powerful tools at the free end of the manoeuvrable arm. In other words, a relatively small working machine can be used to work with relatively heavier, and thus more efficient, tools.

A further purpose of the invention is to achieve a coupling arrangement that allows the removable coupling of a tool with a manoeuvrable arm of a working machine to take place automatically, which may include the remotely controlled locking of tools, and that ensures that a constant, predetermined force of locking is maintained during the work of the working machine with the tool in a safe manner. This has not been possible with prior art coupling arrangements, in particular with the commonly occurring type that is locked by a locking mechanism that comprises a wedge and counterpiece, and where the wedge is driven into the locking mechanism by an operator by hand by means of an impact tool. It should be understood that the locking power of the coupling arrangement with this prior art design will vary in an undesired manner.

These purposes of the invention are achieved through a coupling arrangement that has been given the distinctive features and characteristics that are specified in claim 1. Further characteristics and distinctive features of the invention are made clear by the non-independent claims.

BRIEF DESCRIPTION OF THE DRAWINGS

An embodiment of the invention will be described below with reference to attached drawings, of which:

FIG. 4 shows a side view of a coupling arrangement when its first and second parts are in a connected condition.

FIG. 5A shows a perspective of a control unit as it is seen by an operator, which control unit may be included as a part of a coupling arrangement according to the invention.

FIG. 5B shows in the form of a summary the functions of the control unit in its working mode, and symbols for the setting of the interaction of the coupling arrangement with a coupling part of the tool.

DETAILED DESCRIPTION OF THE PREFERRED EMBODIMENTS

Figure 1A:
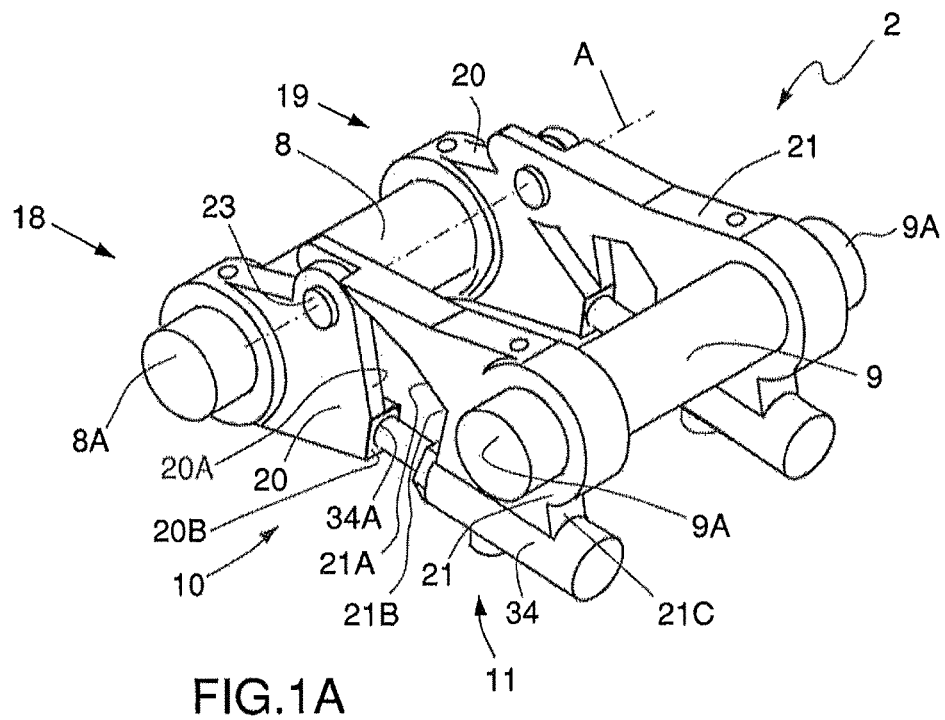
FIGS. 1A-1B show a perspective view of a coupling arrangement according to the invention including a first part that is connected to or that constitutes an integral part of a tool, and a second part that is supported by a manoeuvrable arm that is a component of a working machine.

The arrangement according to the invention shown in the drawings comprises a first part 1 (FIG. 1B) that is connected to a tool and a second part 2 (FIG. 1A) that is connected to a manoeuvrable arm at a working machine. Neither the working machine nor the tool is displayed in its entirety in the drawing, since these in themselves do not constitute any part of the invention.

The part 1 (FIG. 1B) that is supported by the tool comprises two parallel side pieces 3 located at a distance from each other, each one on which demonstrates, at one of its end sections, a protrusion 4 with a U-shaped inwardly open first indentation 5, the bottom of which is semicircular with a specified radius or diameter. Each side piece 3 demonstrates at its second end section a protrusion 6 with a similar U-shaped inwardly facing second indentation 7, corresponding to that described above. The two side pieces 3 that are located pairwise in parallel are so designed that the first indentations 5 in one end section of the side pieces 3 and the indentations 7 in the second end section of the side pieces form pairs that face each other.

It is shown in more detail in FIG. 4 how the opposing pair of first indentations 5 of the side pieces 3 and the second par of second indentations 7 are located on different levels in height with respect to a first plane X1 that intersects the principal or longitudinal axis of the tool perpendicularly. A second plane X2 that intersects the functional support surfaces at each one of the pairwise operating first 5 and second indentations 7 forms an acute angle α with the first plane X1 of the tool. The angle between the two planes X1, X2 may be between 10°-30°, preferably 15°. The purpose of the difference in height is to create space in the vertical direction between the pairwise operating first and second indentations 5, 7 and in this way to create space for a locking mechanism that is a component of the arrangement.

The second part 2 (FIG. 1A) that is a component of the present invention and that is supported by the working machine comprises two parallel circularly cylindrical shafts 8 and 9 that are located at a distance from each other, and that are united by a lever 10 in such a manner that they are allowed to move in a parallel manner towards and away from each other. A locking mechanism 11 is arranged in the lever between the shafts 8 and 9 that makes parallel displacement of the mutually parallel shafts 8, 9 towards and away from each other possible, for the coupling of the tool from and onto the manoeuvrable arm of the working machine.

Figure 1B:
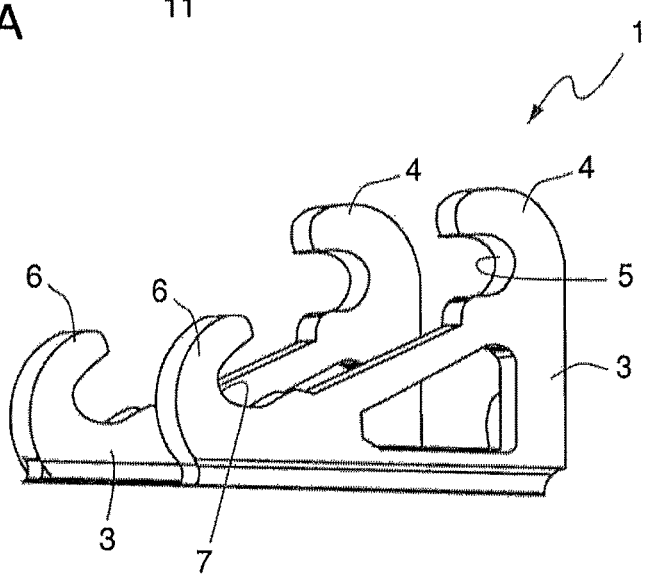
Figure 2:
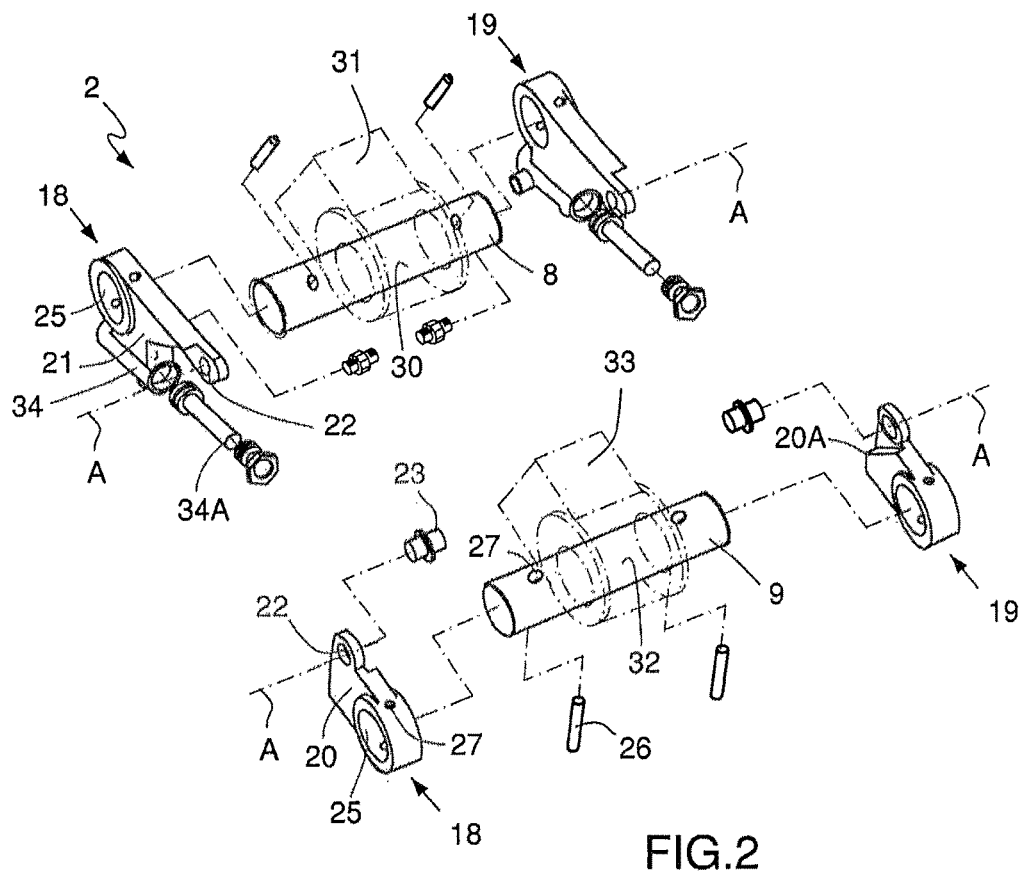
FIG. 2 shows a perspective view of the coupling arrangement with the parts separated, where one end of a displaceable and one end of a fixed arm section of a working machine are shown suggested by a dot-dash contour line.

With reference to FIG. 1A and FIG. 2, the lever comprises first and second knee lever joints 18, 19 that are parallel and located at a distance from each other along a common pivot axis, which constitutes the main axis A around which the knee lever joints are jointed. Since the two knee lever joints are identical, and in principle constitute mirror images of each other, only one knee lever joint will be described in more detail for reasons of simplicity.

Each knee lever joint 18, 19 thus comprises first and second levers 20, 21 each of which, at its ends that are facing each other, is provided with a first hole 22 for a stub axle 23. The said first hole 22 and stub axle 23 together form part of a rotation bearing, with the aid of which the two levers 20, 21 are jointed around main axis A where overlapping elements between the opposing ends of the levers are arranged at the rotation bearing to provide support against each other in a sliding manner in order to further stabilise the arrangement. The first and second levers 20, 21 are each, at their ends that are facing away from each other, provided with a circular second hole 25, the internal diameter of which corresponds to the external diameter of the shaft 8, 9 in order to form bearings. The first and second levers 20, 21 of the knee lever joints 18, 19 are fixed in a manner that does not allow rotation at the said parallel axles 8, 9 through interaction between stop screws 26 and threaded drilled holes 27 that stretch through the lever and shaft.

A study of FIGS. 2 and 4 in more detail will make it clear that the shafts 8, 9 form rotation bearings for a free end of the adjustable arm of the working machine, whereby a central element, or an element located in the middle of one of the shafts 8, forms a bearing 30 that allows pivoting with a free end of a rigid first arm section 31 that is a component of the manoeuvrable arm, suggested in the drawing by a dot-dash contour line. In a similar manner, the second shaft 9 has a central element, or an element located in its centre, that forms a bearing 32 with a free end of a second arm section 33 that is a component of the manoeuvrable arm and that is displaceable relative to the first arm section, whereby this second arm section can be displaced by the influence of a hydraulically operating power cylinder as is shown in FIG. 4. Also the said second arm section 33 that can be displaced is displayed suggested by a dot-dash contour line in FIG. 2.

With reference to FIG. 1, the locking mechanism 11 that makes the parallel displacement of the mutually parallel shafts 8, 9 in a direction towards and away from each other possible comprises a control and actuator means that operates in a longitudinal direction and that is generally denoted by 34. In the embodiment displayed here, a pair of single-action piston-cylinder means 35 of hydraulic type is used as control and actuator means in combination with a means in the form of a discrete pressure means 36 consisting of a spring that permits the tension-based interaction of the shafts 8, 9 with the bottom of the relevant indentation 5, 7 to be maintained through the exertion of a pre-determined constant contact pressure. The locking mechanism 11 is of inverted type and is so designed that the tension-based interaction of the shafts 8, 9 with the indentations 5, 7 is counteracted or removed through the pressurisation of the control and actuator means 34, In the event of a loss of hydraulic pressure, the arrangement enters into tension-based interaction automatically, for reasons of safety.

Figure 3:
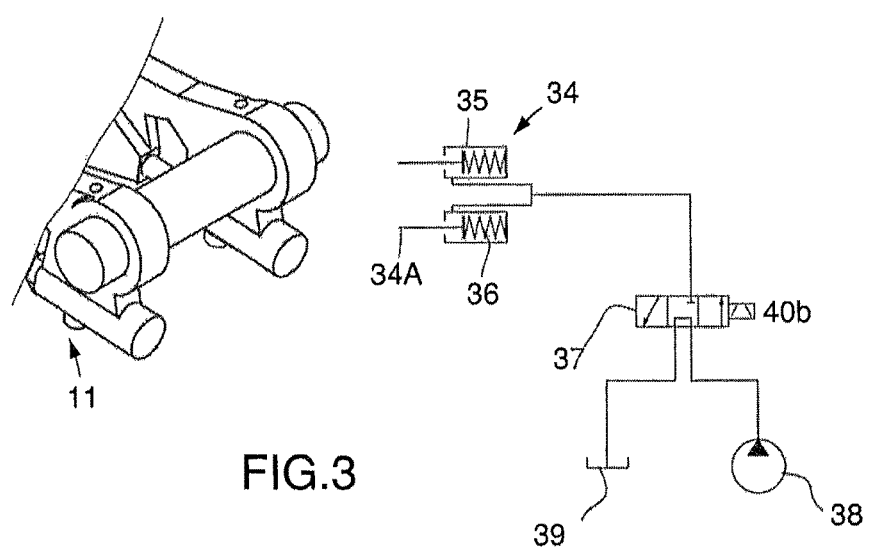
FIG. 3 shows schematically a hydraulic coupling diagram for control and actuator means intended to be used in a coupling arrangement according to the invention.

As is made clear by FIG. 3, a hydraulic system for the displacement of the shafts 8, 9 comprises, in addition to the said pair of piston-cylinder means 35 and springs 36, an electrically controlled valve 37 that can be placed by remote control in connection with the outlet from a pump 38 or tank 39. When the valve 37 is in the central condition displayed in the drawing, the system is in an unengaged condition.

As is shown in FIG. 1A, each control and actuator means 34 is connected at a long side with an element 21C of the second lever 21, which element, when viewed in the pathway of motion of the lever, which has the form of an arc of a circle, extends radially outwards from the joint of the lever with the parallel shaft 9. An indentation 21B is arranged in that part of the short side 21A that extends between the jointed connector at the stub axle 23 and the control and actuator means 34 in the second lever, and which indentation demonstrates a form that corresponds to the short side 20A of the first lever 20. The purpose of this indentation 21B is to make it possible to "reduce" the arrangement, and in this way the parallel shafts 8, 9, to a sufficient extent that the arrangement allows also the coupling with a first part 1 at the tool that is relatively "tight" between its attachment points.

As is made clear by FIG. 3, each control and actuator means 34 comprises a pressure means 36 in the form of a spring that is integrated into the piston-cylinder means 35. The control and actuator means 34 is caused to take up an extended condition through the influence of the pressure means 36. The counteracting force to remove the force of the pressure means 36 and to cause the control and actuator means 34 to take up a withdrawn condition arises through the influence of hydraulic pressure that is led from the pump 38 to the control and actuator means 34.

The opposing ends of the levers 20, 21 form a type of hinge and demonstrate short sides 20A, 21A that are facing each other. The jointed connector is arranged in one end of the opposing short sides 20A, 21A through the stub axle 23 between the levers 20, 21, while a shoulder 20B and the control and actuator means 34 are arranged in the second end of the opposing short sides, located at a radial distance from the jointed coupling. The shoulder 20B functions as a support surface against a free extendable end 34A of a piston of the control and actuator means 34, whereby it should be understood that the free end comes into contact with the shoulder 20B solely as a support, and thus limits the angle of pivot of the knee lever joint in a one-way manner, only in one direction, while the shoulder 20B and the free extendable end 34A of the piston rod of the control and actuator means 34 can be freely set at a distance from each other if the knee lever joint pivots from each other in the opposing direction.

The control and actuator means 34 is connected at a long side with an element 21B of the second lever 21, which element, when viewed in the pathway of motion of the lever, which has the form of an arc of a circle, extends radially outwards from the joint of the lever with the parallel shaft 9. An indentation 21B is arranged in that part of the short side 21A that extends between the jointed connector at the stub axle 23 and the control and actuator means 34 in the second lever, and which indentation demonstrates a form that corresponds to the short side 20A of the first lever 20. The purpose of this indentation 21B is to make it possible to "reduce" the arrangement and in this way the parallel shafts 8, 9 to a sufficient extent that the arrangement allows also the coupling with a first part 1 at the tool that is relatively "tight" between its attachment points.

The free piston rod end 34A of the control and actuator means 34 is driven by the influence of the force from the integrated pressure means 36 to interaction with the shoulder 20B that is a component of the second lever 21, of the knee lever joint, whereby the two shafts 8, 9 move in parallel away from each other. It will become clear how this movement takes place if FIGS. 1 and 3 are studied in more detail.

During the continued motion, the free external end sections 8A, 9A of the shafts 8, 9, the ends that are facing away from each other, will be brought into contact with and in towards the bottom of the relevant indentations 5, 7 that face pairwise away. The pressure means 36 in each control and actuator means 34 has been so chosen that a suitable force of contact is exerted against the shoulder 20B and that the external end sections of the shafts 8, 9 are in this way brought into interaction with the internal contact surfaces of the indentations 5, 7. Due to the constantly exerted force from the pressure means 36, play is eliminated and a join is formed that can maintain a firm and pre-determined force of locking during work with a coupled tool. Due to the inverted design in which the pressure from the hydraulic fluid removes the locking effect, high safety against, for example, rupture of pressurised medium pipelines is obtained, while the interaction between the tool and the fixture remains until the locking force of the pressure means 36 is removed through the application of the above-mentioned hydraulic counteracting force. Parallel displacement of the shafts 8, 9 towards and away from each other is carried out by motion along pathways that have the form of arcs of a circle, the radii of which are determined by the distance between the principal shaft A and each shaft 8, 9.

In the design that is described here, the two control and actuator means 34 that work in parallel are integrated to constitute an integral part of the relevant second lever 21 that is a component of each of the knee lever joints 18, 19, whereby the two shoulders 20B are, in a similar manner, designed to constitute an integral part of the two first levers 20. Not only the piston-cylinder means 35 of the control and actuator means 34, but also the shoulder 20B and the indentation 21B have been manufactured through milling of the relevant lever 20, 21.

As a consequence of this integrated design, a coupling arrangement is obtained in a compact lightweight design, whereby the difference in height between the pairwise operating first and second indentations 5, 7 described in the introduction ensures room for movement for the control and actuator means 34 that faces towards the tool between the arm of the working machine and the coupling part of the tool with the absence of all unnecessary parts, such as intermediate pieces and pairs of shafts, between the free end of the arm of the manoeuvrable arm and the tool. According to the invention, a compact design is obtained in which the manoeuvrable arm and the tool have the two shafts 8, 9 in common.

As is made most clear by FIG. 4, the control and actuator means 34 is located in the space that is defined between the pair of indentations 5 that are located at a greater distance from the first transverse plan X1 of the tool.

In order to facilitate the change of tool on working machines and to make rapid change possible, it has become more common that the displaceable arm of working machines is equipped with a quick-release coupling that can be remotely controlled by an operator. The locking mechanism that is a component of the present coupling can be adapted in one design to include control and actuator means that can be remotely controlled.

One example of such a design is shown in more detail in FIGS. 5A and 5B, whereby the coupling arrangement according to the invention comprises a control unit 40a for remote control intended to be carried by an operator. The operator is placed through the control unit 40a in communication with the hydraulic system of the working machine. The hydraulic system of the working machine can be set, with the aid of the control unit 40a, into different working modes or functions. The working mode that has been selected can be displayed to the operator on a display 40c with the aid of symbols. After the working mode has been selected, the operator can simply couple a tool to the arm of the working machine through the influence of a lever or switch 40b intended for this purpose at the control unit 40a. Following an influence on the switch 40b of the control unit 40a, load is removed from the control and actuator means 34, whereby the free external end sections 8A, 9A of the shafts 8, 9 carry out, through the influence of the pressure means 36, a parallel motion to come into contact with the bottom of the relevant indentation 5, 7 of the coupling part 1 of the tool. The free external end sections 8A, 9A of the shafts 8, 9 are retained with the aid of the spring force of the pressure means 36 with a pre-determined force of locking against the bottom of the indentations 5, 7. The locked condition that has been achieved and is now active is displayed to the operator with a symbol on the display 40c of the control unit 40a.

The invention is not limited to that which has been described above and shown in the drawings: it can be changed and modified in several different ways within the scope of the innovative concept defined by the attached patent claims, in which it should be understood that the pressure means of the locking mechanism in order to maintain a pre-determined tension-based interaction can be designed in a number of different ways, such as hydraulically through a pressure-accumulating tank that is a component of a circuit or through appropriately arranged pressure-reduction valves.

What is claimed is:

1. An arrangement for removing coupling of a tool with a working machine, the arrangement comprising:
    a first part that is supported by the tool and that comprises a first and a second indentations in essentially U-shaped located opposite to and at a distance from each other,
    a second part that is supported by a maneuverable arm that is a component of the working machine and that comprises a first shaft and a second shaft that are introduced into the first and second indentations, respectively in the coupled condition of the arrangement,
    a lever with which the first and the second shafts are coupled in such a manner that they are allowed to move towards and away from each other, and
    a locking mechanism located between the first and the second shafts for the displacement thereof towards and away from each other, and for introduction of the first and the second shafts into the respective indentations,
    wherein the first shaft is coupled with a rigid first arm section that is a component of the maneuverable arm, the second shaft is united at a joint with a second arm section of the maneuverable arm that is mobile relative to the first arm section, the lever comprises at least one pair of knee lever joints, each knee lever joint comprising a first lever and a second lever, the first lever and the corresponding second lever are coupled at their opposing ends with the first shaft and the second shaft respectively,
    a central intermediate region of the first and the second shafts form bearing points that are jointed with the first and second arm sections of the maneuverable arm, while external elements of the first and the second shafts are located in the first and the second indentations, respectively in the coupled condition of the arrangement, and
    the locking mechanism comprises one or several control and actuator means that can be activated through remote control and that operate between the first lever and the corresponding second lever for the displacement of the first and the second shafts from each other to have a tension-based interaction with the bottom of the respective indentations.

2. The arrangement according to claim 1, wherein each control and actuator means comprises a pressure means that permits the tension-based interaction of the first and the second shafts with the bottom of the respective indentations to be maintained through the exertion of a pre-determined contact pressure against the bottom of the indentations.

3. The arrangement according to claim 2, wherein each control and actuator means comprises a piston-cylinder means that is activated by a pressurised medium and that is designed to remove or counteract, through what is known as an "inverted function", when placed under pressure, the tension-based interaction between the first and the second shafts and the bottom of the indentations that is maintained by the pressure means.

4. An arrangement for removing coupling of a tool with a working machine, the arrangement comprising:
    a first part that is supported by the tool and that comprises a first and a second indentations in essentially U-shaped located opposite to and at a distance from each other,
    a second part that is supported by a maneuverable arm that is a component of the working machine and that comprises a first shaft and a second shaft that are introduced into the first and second indentations, respectively in the coupled condition of the arrangement,
    a lever with which the first and the second shafts are coupled in such a manner that they are allowed to move towards and away from each other, and
    a locking mechanism located between the first and the second shafts for the displacement thereof towards and away from each other, and for introduction of the first and the second shafts into the respective indentations,
    wherein the first shaft is coupled with a rigid first arm section that is a component of the maneuverable arm, the second shaft is united at a joint with a second arm section of the maneuverable arm that is mobile relative to the first arm section, the lever comprises at least one pair of knee lever joints, each knee lever joint comprising a first lever and a second lever, the first lever and the corresponding second lever are coupled at their opposing ends with the first shaft and the second shaft respectively, and
    the locking mechanism comprises one or several control and actuator means that can be activated through remote control and that operate between the first lever and the corresponding second lever for the displacement of the first and the second shafts from each other to have a tension-based interaction with the bottom of the respective indentations,
    wherein the first and the second levers comprise a first short side and a second short side, respectively that face each other, in one end of each of short sides, a jointed connector between the first and second levers of the respective knee lever joints is arranged through a guide plug, and in the other end of each of short sides, the control and actuator means is arranged to act in such a manner that the first and the second shafts move away from each other when the control and actuator means is activated.

5. The arrangement according to claim 4, wherein the other end of the first short side comprises a first shoulder that serves as support surface against an extendable piston rod end of the control and actuator means.

6. The arrangement according to claim 5, wherein the first shoulder is arranged in the first lever while the control and actuator means is arranged in the corresponding second lever of the knee lever joint.

7. The arrangement according to claim 4, wherein at least one of the second lever comprises an element that extends in a radial direction of the second shaft, in which the control and actuator means is arranged.

8. The arrangement according to claim 4, wherein the second short side of the second lever is provided with a third indentation having a shape that corresponds to that of the first short side of the corresponding first lever.

9. The arrangement according to claim 1, wherein the first part that is supported by the tool comprises two side pieces located at a distance from each other, each one of side pieces comprises a first and a second protrusions in which the first and the second indentations are arranged, respectively such that openings thereof facing each other, at different levels in height with respect to a first plane (X1) that intersects the principal or longitudinal axis of the tool perpendicularly.

10. The arrangement according to claim 9, wherein a second plane (X2) that intersects functional support surfaces at each one of the pairwise operating first and second indentations forms an acute angle (a) with the first plane X1, where the angle between the two planes is between 10°-30°.

11. The arrangement according to claim 1, wherein the control and actuator means is manufactured as an integral part of the first and second levers which are components of the knee lever joint through milling of the arm.

12. The arrangement according to claim 1, wherein the control and actuator means can be set linearly in the longitudinal direction and can be remotely controlled through a control unit intended to be carried by an operator, said control unit comprises a lever or switch that, when influenced, activates the control and actuator means to take up a withdrawn or extended condition.

13. A method of removing a tool from a working machine using the arrangement according to claim 1, comprising:
  activating the control and actuator means by pressurised medium so as to remove or counteract the tension-based interaction between the first and the second shafts and the bottoms of the first and the second indentations that is maintained by a pressure means.

* * * * *